United States Patent
Regan et al.

(10) Patent No.: US 10,901,933 B2
(45) Date of Patent: Jan. 26, 2021

(54) PROGRAMMABLE LINK TRAINING SEQUENCES

(71) Applicant: HEWLETT PACKARD ENTERPRISE DEVELOPMENT LP, Houston, TX (US)

(72) Inventors: James D. Regan, Ft. Collins, CO (US); Daniel A. Berkram, Ft. Collins, CO (US); John M. Wastlick, Plano, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/443,435

(22) Filed: Jun. 17, 2019

(65) Prior Publication Data
US 2020/0394148 A1 Dec. 17, 2020

(51) Int. Cl.
| | | |
|---|---|---|
| *G06F 13/20* | (2006.01) | |
| *G06F 13/42* | (2006.01) | |
| *G06F 9/448* | (2018.01) | |
| *G06F 9/445* | (2018.01) | |

(52) U.S. Cl.
CPC ........ *G06F 13/4282* (2013.01); *G06F 9/4498* (2018.02); *G06F 9/44505* (2013.01); *G06F 13/20* (2013.01)

(58) Field of Classification Search
None
See application file for complete search history.

(56) References Cited

U.S. PATENT DOCUMENTS

| | | | | |
|---|---|---|---|---|
| 7,715,323 | B2 * | 5/2010 | Connolly | H04J 3/047 370/213 |
| 8,996,757 | B2 * | 3/2015 | Thurston | G06F 30/34 710/36 |
| 9,552,322 | B2 * | 1/2017 | Yeung | G06F 13/4221 |
| 9,830,292 | B2 | 11/2017 | Wagh et al. | |
| 9,888,507 | B2 * | 2/2018 | Kyles | H04L 63/0428 |
| 9,965,439 | B2 | 5/2018 | Das Sharma | |
| 2006/0045031 | A1 * | 3/2006 | Hickey | H04L 1/0061 370/266 |

(Continued)

OTHER PUBLICATIONS

Intel.com; "IP Core Architecture"; printed on Jan. 8, 2019 from webpage: https://www.intel.com/content/www/us/en/programmable/documentation/lbl1414013788823/nik1410905695797.html; 12 pages.

*Primary Examiner* — Elias Mamo
(74) *Attorney, Agent, or Firm* — Trop, Pruner & Hu, P.C.

(57) ABSTRACT

A technique includes, in response to feedback received from ongoing link training with an endpoint device over a serial communication link, a processor identifying a first training set sequence to be communicated as part of the ongoing link training. The technique includes the processor selecting a first state machine of a plurality of state machines; and the processor programming the selected first state machine to communicate the first training set sequence to the serial communication link. The programming of the first state machine includes programming the first state machine with a data pattern that is associated with the first training set sequence and programming the first state machine with a condition to regulate a number of times that the state machine communicates the data pattern to the serial communication link.

16 Claims, 10 Drawing Sheets

(56) References Cited

U.S. PATENT DOCUMENTS

| | | | |
|---|---|---|---|
| 2011/0206141 A1* | 8/2011 | Barrett | H04L 5/1438 375/259 |
| 2015/0261718 A1 | 9/2015 | Campbell et al. | |
| 2017/0116148 A1* | 4/2017 | Iyer | G06F 13/4004 |
| 2018/0329855 A1 | 11/2018 | Das Sharma | |

* cited by examiner

PROGRAMMABLE LINK TRAINING SEQUENCES

BACKGROUND

High speed serial communication interconnects, or links, have become ubiquitous throughout modern computer systems. A serial communication link is a point-to-point communication channel between the ports of a pair of end point devices. A serial communication link may contain one or multiple lanes. A lane refers to communication lines of the serial communication link; and for a multiple lane link, packets of data that are communicated between the end point devices may be striped across the multiple lanes. The end point devices may negotiate the physical parameters (e.g., the number of lanes, or width, of the link; the link data rate; lane polarity; and so forth) that are be used for the link by communicating ordered sets of data (called "training sets") with each other during a process called "link training."

DETAILED DESCRIPTION

A high speed serial communication interconnect, or link, may undergo a link training process in which a pair of end point devices send and receive ordered sets of data (called "training sets," "training set sequences" or "training sequences" herein) for such purposes as achieving symbol lock, achieving bit lock and negotiating physical parameters of the link. For example, for PCIe link training, TS1 ordered training sets may be communicated over lanes of the link to propose physical link parameters (the link data rate, lane polarity, link width, and so forth), and TS2 ordered training sets may be communicated over the lanes of the link to confirm parameters and accept/reject proposed parameters.

One of a number of different protocols (PCIe, InfiniBand, Universal Serial Bus, and so forth) may be used in connection with a serial communication link. Moreover, the link training may involve a series of phases, with the phases depending on the results of the ongoing link training, such as whether agreement has been reached on certain physical parameters and whether negotiation is to continue on other parameters. Link training phases may be used for other purposes such as, for example, selecting an upper level protocol that runs on top of the physical layer. For example, the physical layer may be a PCIe layer, and a particular phase of the link training may be used to determine whether the end point devices are capable of negotiating upper level protocols (Ethernet, USB, Infiniband, and so forth) that run on top of the physical PCIe layer.

A serial communication link interface may therefore generate and detect any of a potentially large number of different training sets during link training. Moreover, a given serial communication link interface design may potentially be limited to existing serial link protocols, as the serial communication link interface may not be constructed to accommodate protocols to be developed in the future. One way to construct a serial communication link interface to accommodate a number of training sets is to incorporate multiple sets of hardware in the physical layer of the interface, so the appropriate sets of hardware may be enabled to generate and detect training sets. This approach, however, may limit the number of protocols that the physical layer may accommodate and may, in general, limit the flexibility of the physical layer to accommodate new protocols.

In accordance with example implementations that are described herein, a serial communication link interface includes one or multiple programmable link training engines. In general, a programmable link training engine is associated with one or multiple lanes of a serial communication link and may be programmed by a processor during an ongoing link training process to generate a particular training set for an upcoming phase of the link training process. More specifically, in accordance with example implementations, the programmable link training engine includes a training set generator and a training set decoder. The training set generator includes multiple hardware-based finite state machines (called "state machines" herein), which may be programmed by the processor to generate training sets to be provided to a transmit lane of a serial communication link interface; and the training set decoder includes multiple finite state machines, which may be programmed by the processor to detect training sets to be received from a receive lane of the serial communication link interface.

More specifically, for a particular upcoming phase of link training, the processor may identify a particular training set that is to be provided by the link training set generator and determine whether a particular state machine of the training set generator has already been programmed to provide this training set. If so, the processor selects this state machine and registers the state machine with an arbiter of the training set generator so that the arbiter selects the state machine during the next phase. If a state machine is not programmed, or set up, for the identified training set, then the processor, in accordance with example implementations, selects an idle state machine of the training set generator and programs the state machine to generate the training set before registering the programmed state machine with the arbiter.

It is noted that for a particular link training phase, the processor may program multiple state machines of the training set generator and register the multiple programmed state machines with the arbiter, with access to the lane being controlled by the arbiter based on an arbitration policy (a least recently used (LRU) arbitration policy, for example). In this way, the multiple state machines of the training set generator may generate respective time multiplexed training sets (i.e., "ping ponging" training sets), as controlled by the arbiter. At the end of a link training phase, the processor may deregister the state machine(s) of the training set generator with the arbiter and register one or multiple other state machines with the arbiter for the next link training phase. In a similar manner, the processor may program, reprogram and select different state machines of the training set decoder during the various phases of link training. As such, the selection, programming and possibly reprogramming of the state machines of the programmable link training engine may occur throughout the link training.

The programming of a state machine of the training set generator may involve the processor writing to registers that are associated with the state machine. For example, the programming may involve the processor writing to registers with data that corresponds to a particular training set, data representing a particular mode of operation for the state machine, data representing a condition to trigger generating the training set, data representing a condition to trigger exiting the generation of the training set, and so forth.

For an upcoming phase of link training, the processor may also select an idle state machine of the training set decoder and program the state machine to detect a training set sequence from the receive lane of the serial communication link. In general, the processor may select an idle state machine of the training set decoder and write data to registers that are associated with training set decoder to program the state machine. In accordance with example implementations, the programming may include the processor writing data to the registers to select a state machine of the training set decoder that is associated with capturing a full set of training data and to set up the selected state machine to recognize a particular training set header. The programming may also include, in accordance with example implementations, the processor writing data to the registers to select a state machine of the training set decoder that is associated with capturing training set header data (and ignoring the rest of the data) and to set up the selected state machine to recognize the particular training set header.

Figure 1:
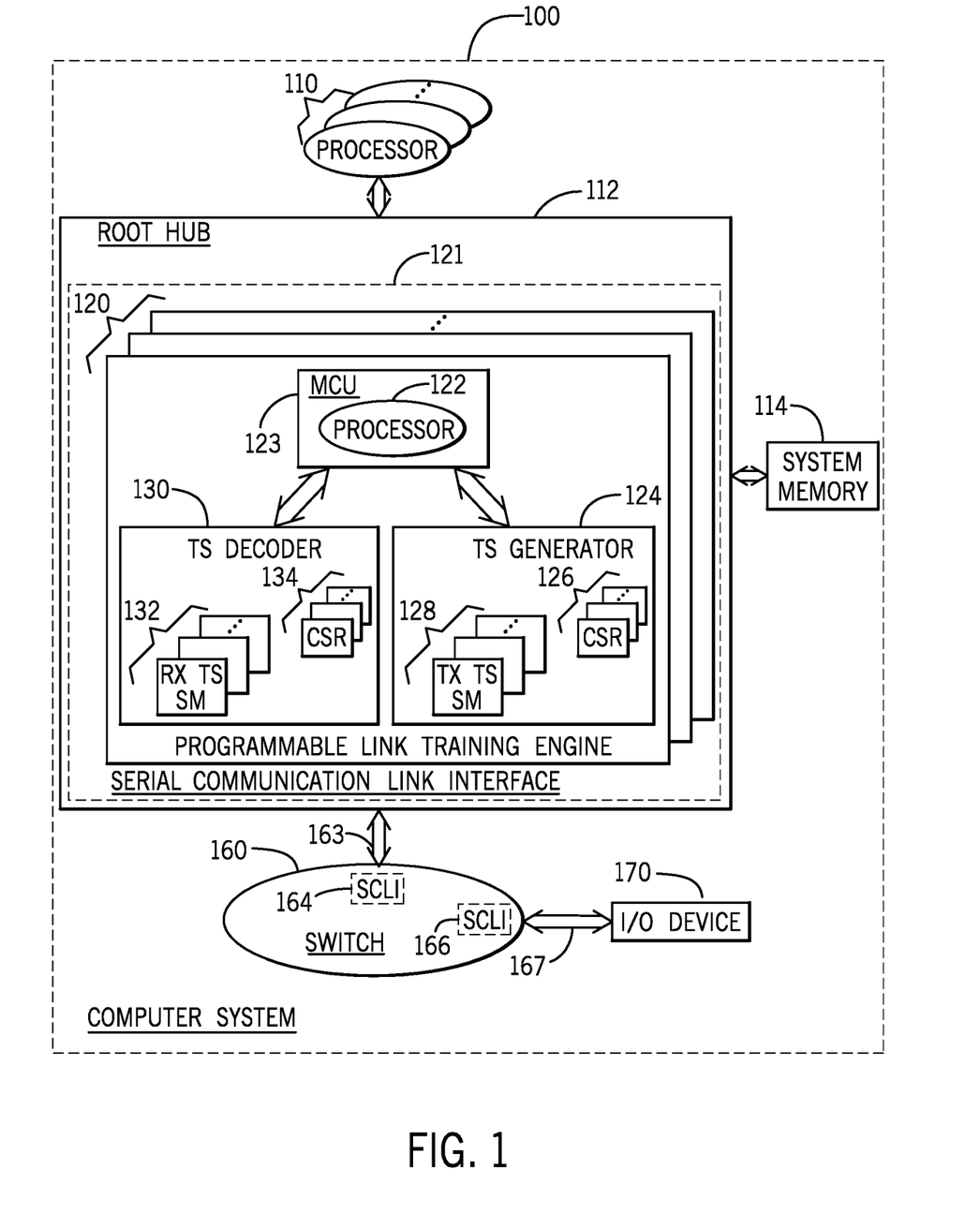
FIG. 1 is a schematic diagram of a computer system having programmable link training engines according to an example implementation.

As a more specific example, FIG. 1 depicts a computer system 100 in accordance with some implementations. In general, the computer system 100 includes one or multiple serial communication interconnects, or links, such as serial communication links 163 and 167; and the computer system 100 includes serial communication link interfaces, such as serial communication link 121, that allow end point devices to communicate with the serial communication links.

In the context of this application, a serial communication interconnect, or "link," includes a set of one or multiple transmit lanes and a set of one or multiple receive lanes. A "lane" refers to a single serial interface that is used for data transmission and includes either a pair of lines, which communicate a differential signal that represent the data, or a single-ended signal (i.e., a common mode signal) that is received from a communication line and which represents data. The "signals" may be electrical signals or optical signals. Moreover, the serial communication link may have an asymmetric number of transmit and receive lanes (four transmit lanes and two receive lanes, as an example), or have the same number of transmit and receive lanes, depending on the particular implementation.

As depicted in FIG. 1, the serial communication link interface 121 may be part of a serial interconnect root hub 112 of the computer system 100, such as, for example, a memory controller hub, an input/output (I/O) hub, a north bridge, a south bridge, a chipset incorporating one or more of the foregoing components, and so forth. Regardless of its particular form, through a port of the root hub 112, components of the computer system, such as one or multiple processors 110 (central processing units (CPUs), CPU processing cores, and so forth) and a system memory 114, communicate with one or multiple input/output devices 170 (e.g., an expansion card, a network interface controller (NIC), a storage device, a mouse, a printer, a keyboard, and so forth).

As depicted in FIG. 1, the serial communication link 163 connects the serial communication link interface 121 to a port of a switch 160, and the switch 160 may have one or multiple other ports that are connected to other serial communication links. For the example implementation that is depicted in FIG. 1, the switch 160 contains a port that is connected to a serial communication link 167, which is also connected to an input/output (I/O) device 170. The switch 160 may be, as an example, one or multiple bridges (one or multiple PCIe bridges, for example). Moreover, for the example implementation that is depicted in FIG. 1, serial communication link interfaces 164 and 166 of the switch 160 are connected to the serial communication links 163 and 167, respectively. The root hub 112 contains a serial communication link interface 121 that is connected to the serial communication link 163. It is noted that in accordance with further example implementations, the switch 160 may have more than two serial communication link ports and the root hub 112 may have various other serial communication ports that are connected to other switches, and other endpoint devices.

In accordance with example implementations, for purposes of generating training sets and decoding, or detecting, training sets associated with lanes of the serial communication link 163, the serial communication link interface 121 includes one or multiple programmable link training engines 120. It is noted that although not shown and specifically described herein, other serial communication link interfaces of the computer system 100 may contain one or multiple programmable link training engines 120.

In general, the programmable link training engine 120 is associated with one or multiple lanes of the serial communication link 164. In this manner, the programmable link training engine 120 may be associated with a transmit lane; may be associated with a receive lane; or may be associated with a transmit lane and a receive lane. Operations of the programmable link training engine 120 are controlled by a processor 122 (a processing core of a microcontroller unit (MCU) 123, for example). In accordance with some implementations, each programmable link training engine 120 may contain a processor 122 (and MCU 123, for example). However, in accordance with further example implementations, a single processor 122 (and MCU 123, for example) may be shared by multiple programmable link training engines 120.

In general, the processor 122, for an upcoming phase of link training with the serial communication link 163, determines the training set(s) to be communicated to the serial communication link 163 during the phase and the corresponding training set(s) to be detected (and thus, received) during the phase. Based on this determination, the processor 122 prepares the training set generator 124 and the training set decoder 130 for the upcoming phase by selecting state machines of the generator 124 and decoder 130, possibly programming one or more of these state machines, and possibly reprogramming one or more of these state machines.

The programming, in accordance with example implementations, involves the processor 122 writing data to configuration and status registers 126 that are associated with the training set generator 124 and writing data to configuration and status registers 134 that are associated with the training set decoder 130. As described further herein, by writing to the registers 126 and 134, the processor 122 may program hardware finite state machines 128 (herein called the "transmit training set state machines 128" or "state machines 128") of the training set generator 124 to generate training sets to be communicated to a lane of the serial communication link 163 and program hardware finite state machines 132 (herein called the "receive training set state machines 132" or "state machines 132") of the training set decoder 130 to detect training sets from the serial communication link 163.

In this context of this application, a finite state machine, or "state machine," refers to a hardware logic-based circuit, such as a hardware machine that is formed from flip-flops and combinatorial logic gates and is designed based on a hardware description language (Very High Speed Integrated Circuit (VHSIC) Hardware Description Language, or "VHDL," for example). The state machine performs sequential logic, has multiple potential states, is in a single state at a given time, and has steering logic to guide the transition from one state to the next. Moore and Mealy state machines are two examples of finite state machines. The programming of a state machine refers to configuring any aspect of the state machine, such as, for example, setting the number of states, changing an output of the state machine for a particular state, changing output decoding for the state machine, changing input encoding for the state machine, changing logic to steer transitions between states, changing an initial state of the state machine, changing an exit condition for the state machine, and so forth. As such, programming a state machine may involve, for example, disabling a particular flip-flop, enabling a particular flip flop, enabling a combinatorial logic gate, disabling a combinatorial logic gate, providing an input that changes how decisions or inputs are interpreted, providing an input that triggers an exit condition, and so forth.

In accordance with some implementations, the programming of a transmit training set state machine 128 includes programming the state machine 128 with a condition to regulate a number of times that the state machine 128 communicates a particular data pattern (i.e., a training set) to a transmit lane of a serial communication link.

Figure 2:
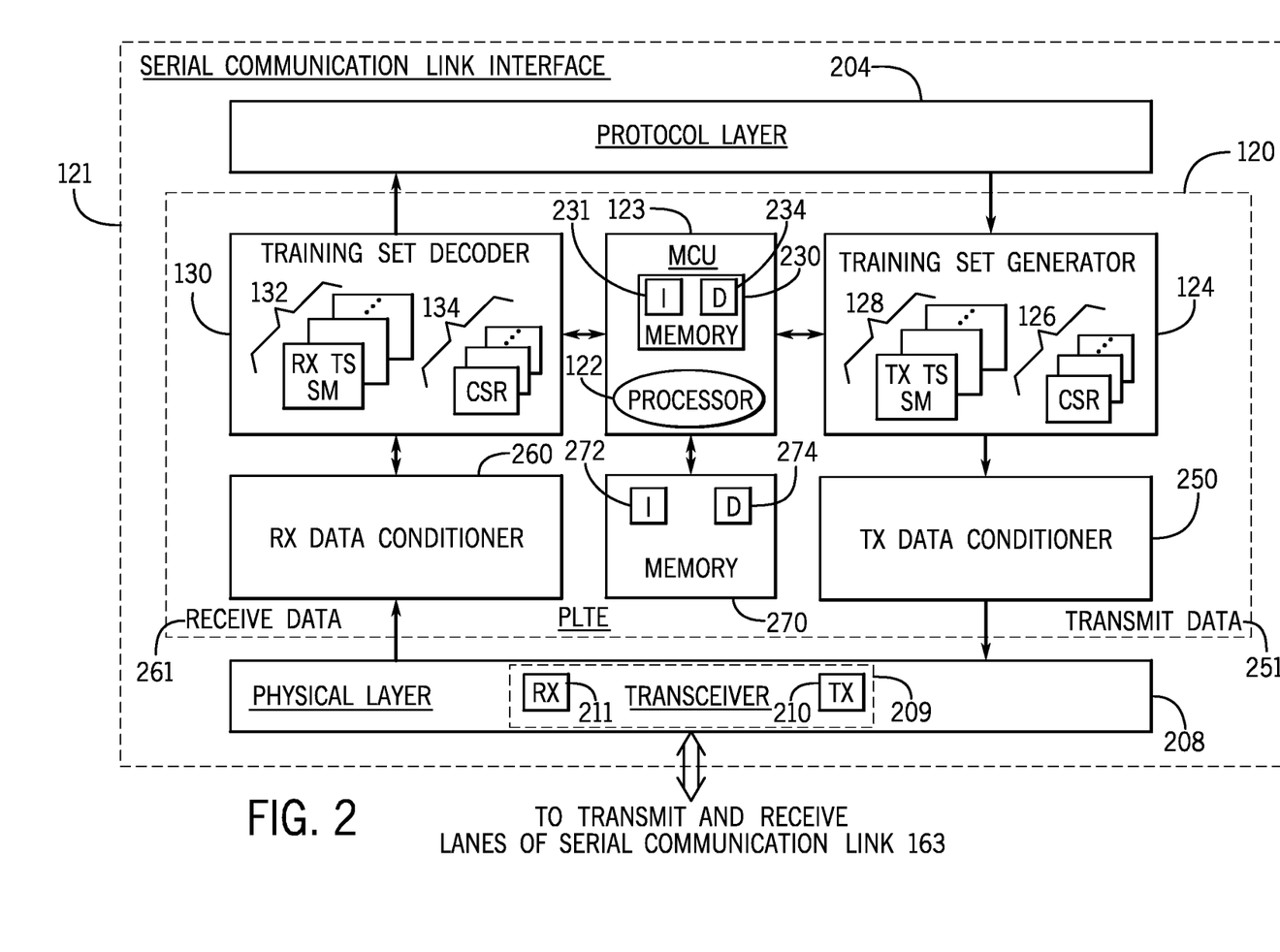
FIG. 2 is a schematic diagram of the programmable link training engine of FIG. 1 according to an example implementation.

FIG. 2 depicts an example implementation of the serial communication link interface 121. In general, the serial communication link interface 121 supports a multiple layer protocol interface, and as such, the interface 121 includes an upper protocol layer 204, which may, for example, represent a number of potentially different upper layer protocols to be used with the serial communication link 163. For example, the upper protocol layer 204 may represent transport and linking layers associated with a wide variety of protocols that may, for example, be on top of a lower physical layer 208 (or "PHY"), such as a PCIe PHY.

As depicted in FIG. 2, in addition to the processor 122, the MCU 123 may include a memory 230. In general, the memory 230 is a non-transitory memory that may be associated with any of the number of memory storage technologies, such as semiconductor-based memory storage technologies as well as other storage technologies. In general, the memory 230 stores machine executable instructions 272 (i.e., software, such as firmware) which, when executed by the processor 122, cause the processor 122 to perform various actions described herein pertaining to making decisions regarding training sets to be transmitted to the serial communication link and received from the serial communication link 163, the programming of the training set generator 124, the programming of the training set decoder 130, and so forth. The memory 230 may further store data 234 (data representing program variables, settings, identified protocols, identified training sets to be used in an upcoming phase of link training, and so forth).

As depicted in FIG. 2, the processor 122 may have access to a memory 270 external to the MCU 123, and the memory 270 may store data 274, such as data pertaining representing training data sets (TS1 and TS2 ordered sets for the case of PCIe, for example), and so forth. In general, the memory 270 may be a non-transitory storage medium that is formed from one of many different types of memory storage technologies, such as semiconductor device-based storage technology or other storage technology.

The memory 270 may also, in accordance with example implementations, store machine executable instructions 272 that are associated with multiple link training state machines (e.g., a link training and status state machine (LTSSM) for PCIe) that are associated with different protocols. In this manner, in accordance with example implementations, for link training for a particular protocol, the processor 122 may load the appropriate state machine instructions from the memory 270 into the memory 230 where the instructions are then executed by the processor to implement the particular link training state machine. In accordance with further example implementations, the MCU 123 may be updated with firmware for one or multiple link training status and state machines for protocols over than PCIe.

Thus, in accordance with example implementations, firmware may be used to implement the link training state machine for the decisions that are not latency critical (decisions that may be made in respective time intervals of 100 nanoseconds or more, for example), and the programmable hardware state machines 128 and 132 are used to make cycle-by-cycle decisions, such as decision pertaining to what data to send over a transmit lane of the serial communication link 163 and what to data to detect from a receive lane of the serial communication link 163.

As depicted in FIG. 2, the programmable link training engine 120 may have various other components, such as a transmit data conditioner 250 and a receive data conditioner 260. The transmit data conditioner 250 conditions the training set data that is provided by the training set generator 124 and provides corresponding conditioned transmit data 251 to the physical layer 208. In accordance with example implementations, the transmit data conditioner 260 is controlled by the training set generator 124 and may perform such functions as performing scrambling; adding bits for physical layer encoding (e.g., 64*b*/66*b* encoding) to distinguish control traffic from data traffic; performing gray coding for PAM4 modulation; perform Differential Manchester Encoding (DME) for Ethernet link training; and performing precoding to mitigate burst errors caused by the decision feedback equalizer on the remote receiver. In accordance with example implementations, the receive data conditioner 260 may be controlled by the training set decoder 130 may perform such functions as unscrambling the data and decoding the data.

After link training completes, in accordance with example implementations, the training set generator 124 forwards traffic from the upper protocol layer 204 to physical layer 208; and the training set decoder 130 forwards the traffic from the physical layer 208 to the upper protocol layer 204.

As depicted in FIG. 2, in accordance with example implementations, the physical layer 208 includes a transceiver 209 to generate and receive the signals for communicating with transmit and receive lanes of the serial communication link 163. The transceiver 209 includes a transmitter 210 for purposes of generating a single-ended transmit signal or a differential pair of transmit signals to transmit data to one single ended communication line or a pair of differential communication lines of the transmit lane; and the transceiver 209 includes a receiver 211 for purposes of detecting data appearing on the received single-ended communication line or pair of differential communication lines of the receive lane.

Figure 3:
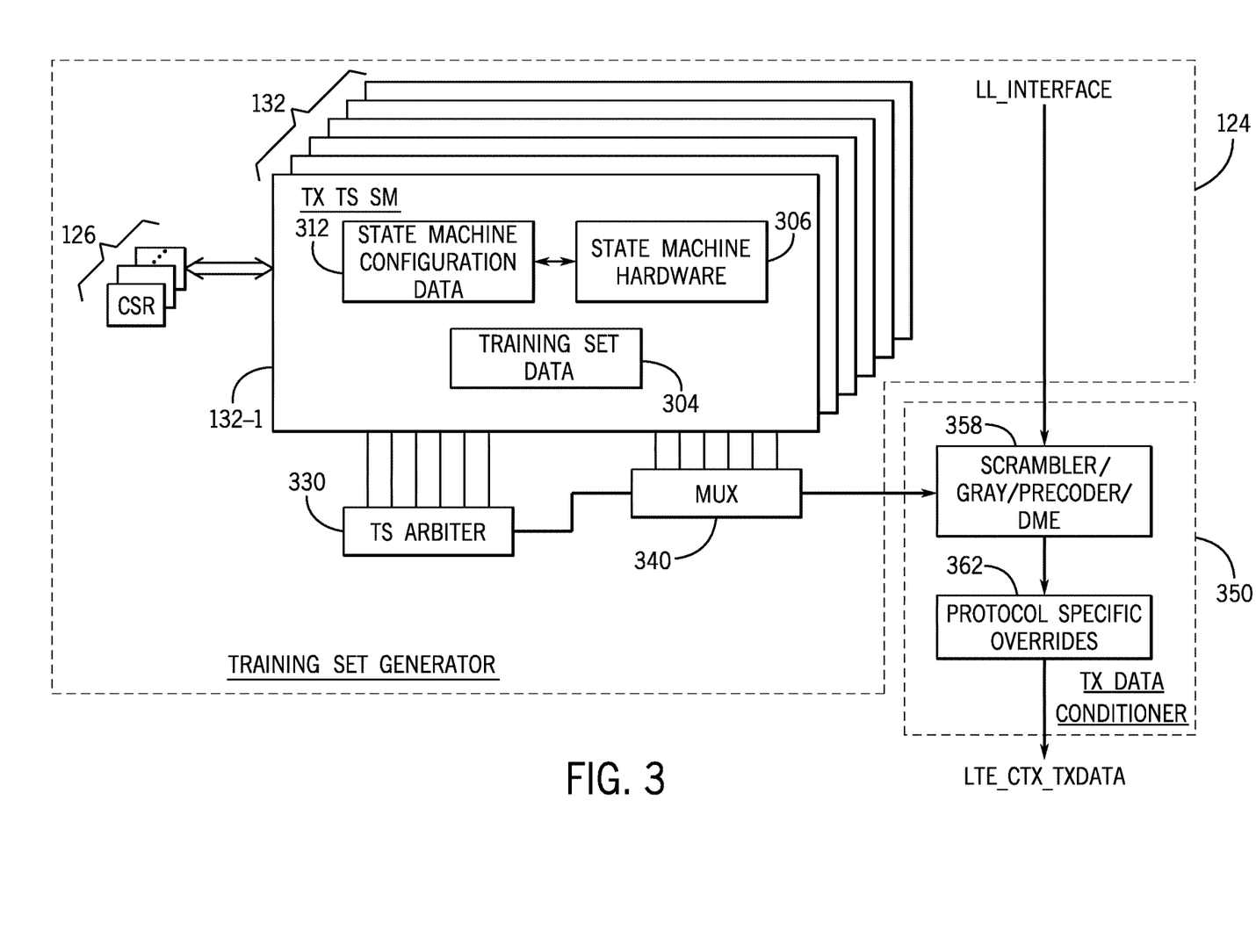
FIG. 3 is a schematic diagram of a training set generator and transmit data conditioner of the programmable link training engine of FIG. 2 according to an example implementation.

FIG. 3 depicts a schematic diagram of the training set generator 124 and transmit data conditioner 350, in accordance with example implementations. In particular, FIG. 3 depicts six available transmit training set state machines 128, although the training set generator 124 may have more than or fewer than six transmit training set state machines 128, in accordance with further implementations. FIG. 3 particularly sets forth details regarding a particular state machine 128-1, with the other state machines 128 having similar designs, in accordance with example implementations.

By writing data to the registers 126, the processor 120 may program various parameters associated with the transmit training set state machine 128. In this manner, the processor 122 may write to the registers 126 to configure the state machine 128 with state definition data 312 that controls the operation of state machine hardware 306 (flip-flops, combinatorial logic, and so forth) to define states of the state machine 128, state transition steering, input encoding, output decoding, and so forth. As described below, in accordance with example implementations, the data 312 defines a mode of operation of the state machine 128, a length of the training set, a number of times to send a particular training set to the transmit lane, and so forth. The processor 122 may also write to the registers 126 with training set bit array data 304, which is an ordered set of data from which a partial subset or the full subset may be selected as the training set that is sent to the transmit lane.

In accordance with example implementations, the data 312 may represent the following configuration parameters for the state machine 128. First, the data 312 may represent whether the training set is to be a header only training set (two byte training sets) or a full training set. For a full training set, the data 312 may define a training set length, a training set count, and a mode of operation for the state machine 128. The training set length may be, for example, the number of 32 bit words of the training set data 304 to send in one training set. The training set count (called "ts_count" herein) is the number of times that the training set is to be repeated.

The modes of operation of the state machine 128, in accordance with example implementations, include a ts_cnt_exact_mode mode of operation in which the state machine 128 generates the training set an exact number of times specified by the ts_count training set count. For this mode of operation, a pointer, ts_next, points to the next transmit set (i.e., points to a next part of the bit array corresponding to the data 304) when the ts_count count expires.

The state machine 128 may be placed in a ts_cnt_exact_time_mode mode of operation, a mode in which the state machine 128 repeatedly generates the training set for a predetermined duration set by a parameter ts_count usec, and then transitions to the next training set pointed to by the ts_next pointer.

In a ts_cnt_cycles mode of operation, the state machine 128 counts core clock cycles before transitioning to the next training set sequence. This may be useful in an initial phase of the link training before data is being requested by the end point device.

The state machine 128 may be placed in another mode of operation, a ts_exit_to_next_ts mode of operation, in which the processor 122 has control of when the transition to the next training set occurs, as defined by the ts_next pointer.

In an ts_cnt_events_mode mode of operation, the state machine 128 awaits the occurrence of an external event before transmitting a single training set sequence.

In an ts_cnt_events_mode_L0 mode of operation, the state machine 128 generates a single training set in response to an external event with the L0 framing logic coordinating insertion of the training set.

During a given phase of link training, the processor 122 may register a single state machine 128 with the arbiter 330 or may register multiple state machines 128 with the arbiter 330. When multiple state machines 128 are registered, the arbiter 330 may arbitrate (using a least recently used (LRU) arbitration scheme, for example) to determine which of the active, registered state machines 128 generate data. An arbiter 330 of the training set generator 124 controls which transmit training set state machine 128 has access to the transmit lane of the serial communication link 163 at one time. Each time a training set is sent to the transmit lane, the corresponding transmit training set state machine 128 relinquishes control to the transmit lane (assuming that multiple state machines 128 are active and registered with the arbiter 330), and then, the arbiter 330 applies an arbitration scheme (the LRU arbitration scheme, for example) to select one of the state machines 128 and control a multiplexor 340 to couple the selected state machine 220 to the transmit data conditioner 250.

When link training is not ongoing, the transmit data conditioner 350 receives data (represented by LL_INTERFACE) from the upper protocol layer 204, performs conditioning (i.e., one or more of performing scrambling, precoding, protocol overriding and so forth via components 358 and 362) of the data, and provides the data (represented by the LTE_CTX_TXDATA) to the physical layer 208 for transmission to the transmit lane. When link training is ongoing, the transmit data conditioner 350 receives its data from the output of multiplexer 340 and provides the conditioned data, as controlled by the training set generator 124, to the physical layer 208 for transmission to the transmit lane.

Figure 4:
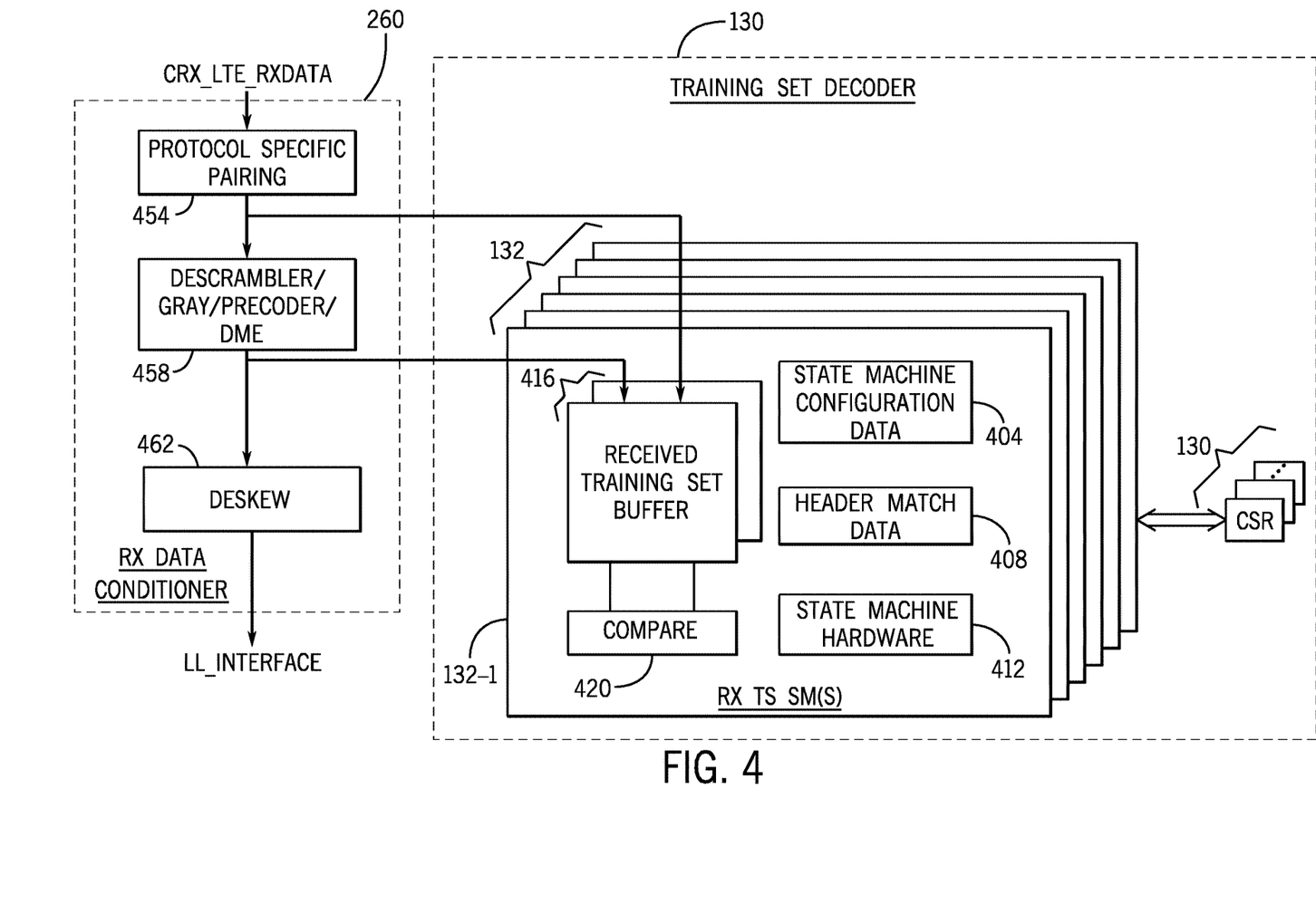
FIG. 4 is a schematic diagram of a training set decoder and a receive data conditioner of the programmable link training engine of FIG. 2 according to an example implementation.

FIG. 4 depicts the training set decoder 130 and receive data conditioner 260, in accordance with example implementations. Although FIG. 4 depicts the training set decoder 130 having six state machines 132, the training set decoder 130 may have more than or fewer than six state machines 132, in accordance with further implementations. FIG. 4 particularly sets forth details regarding a particular state machine 132-1, with the other state machines 132 having similar designs, in accordance with example implementations.

In general, referring to state machine 132-1, the state machine 132 may include a pair of buffers 416 (128 bit buffers, for example) to receive training set data from the lane of the serial communication link 163. The state machine 132 may include compare logic 420 that is coupled to the buffers 416 for purposes of performing the comparison of data stored in the buffers 416 and indicating a result of the comparison (via a register 130, for example).

In accordance with example implementations, some of the state machines 132 may be designated to capture full training sets and other state machines 132 may be designated to capture the headers of the training sets with the remainders of the training sets being ignored. Depending on whether a header only training set or a full training set is expected to be received, the processor 122 may program and use the appropriate state machine 132. In accordance with further implementations, processor 122 may program a given state machine 132 to set up the state machine 132 to capture either full training sets or training set headers.

For a state machine 132 that captures a full training set, each buffer 416 may capture up to a 128-bit training set. The compare logic 420 compares the headers (wherein the header may be up to the first 64 bits, for example) of the training sets that are captured in each buffer 416, and the remainders of the bits of the two training sets are captured in the buffers 416. In accordance with some implementations, bits of the registers 130 may indicate whether corresponding fields of the buffers match to allow the processor 122 to detect field changes. In accordance with some implementations, the compare logic 420 maintains a count of the number of training set header matches that occur, and when the count reaches a threshold (one to seven counts, as an example, as programmed via a register 130), the processor 122 may read the training set data from one of the buffers 416.

For a state machine 132 that captures training set headers, each buffer 416 may capture the headers of training sets, the compare logic 420 maintains a count of the number of training set header matches that occur, and when the count reaches a threshold, the processor 122 may read the header from one of the buffers 416.

As depicted in FIG. 4, the receive data conditioner 260 may receive raw data (represented by the CRX_LTE_RX-DATA signal) from the receive lane of the serial communication link 163 and logic 454 may perform protocol specific pairing of the data. Depending on the programming set up by the processor 122, either the output of the logic 454 or descrambled data (as provided by logic 458) may be received in the training set buffers 416.

When link training is not occurring, the receive data conditioner 260 passes the data received from the serial communication link 163 to the upper protocol layer 204. As depicted in FIG. 4, a deskewing circuit 462 may deskew the output of logic 458 and provide data (via the LL_INTERFACE signal) to the protocol layer 204.

In accordance with some implementations, the received data conditioner 260 may include such components as protocol specific parsing logic 454, preconditioning logic 458 to perform such functions as descrambling, gray decoding, DME, and so forth and deskew logic 462.

Figure 5A:
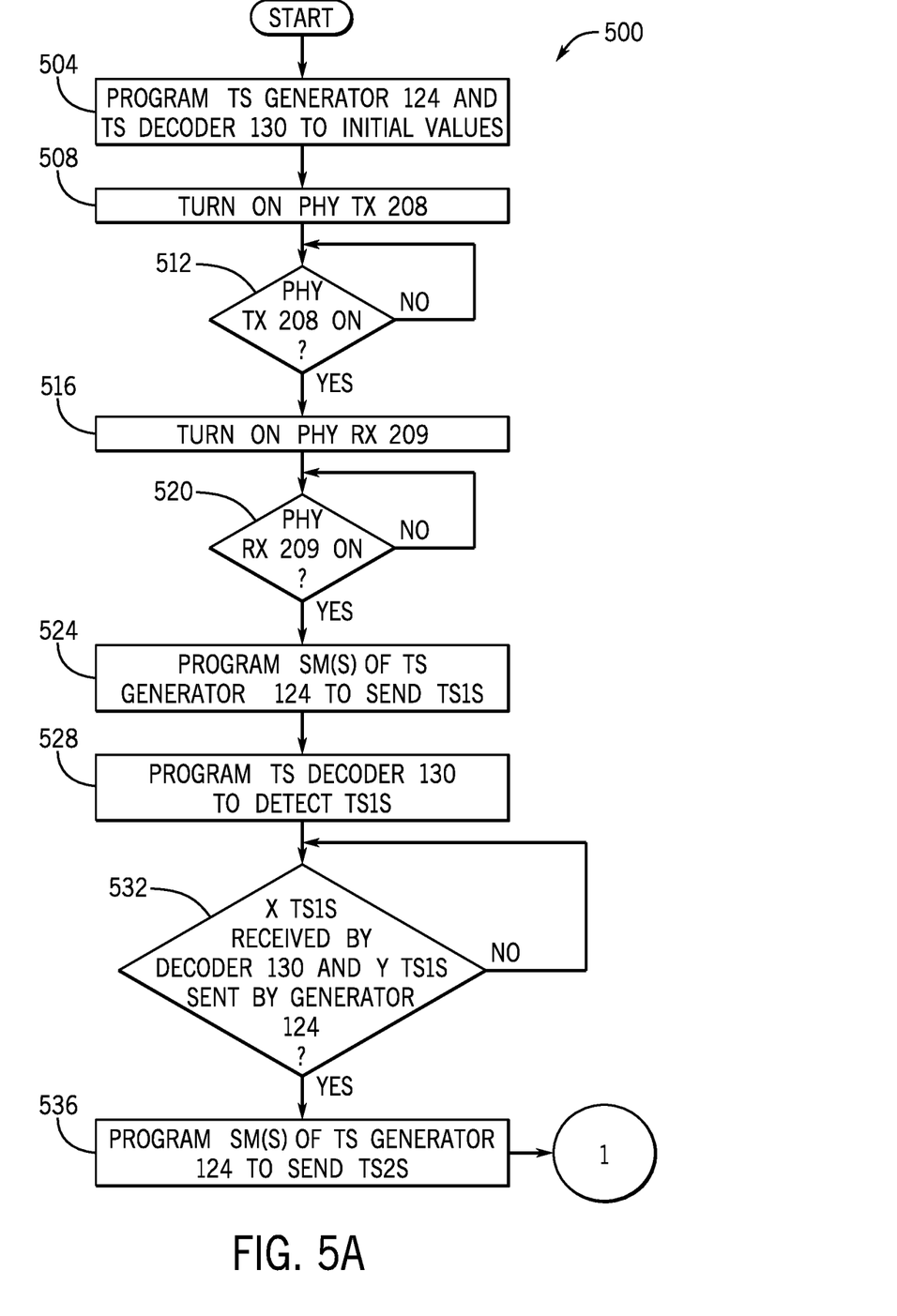
FIGS. 5A and 5B depict example actions taken by the programmable link training engine in connection with link training according to an example implementation.
Figure 5B:
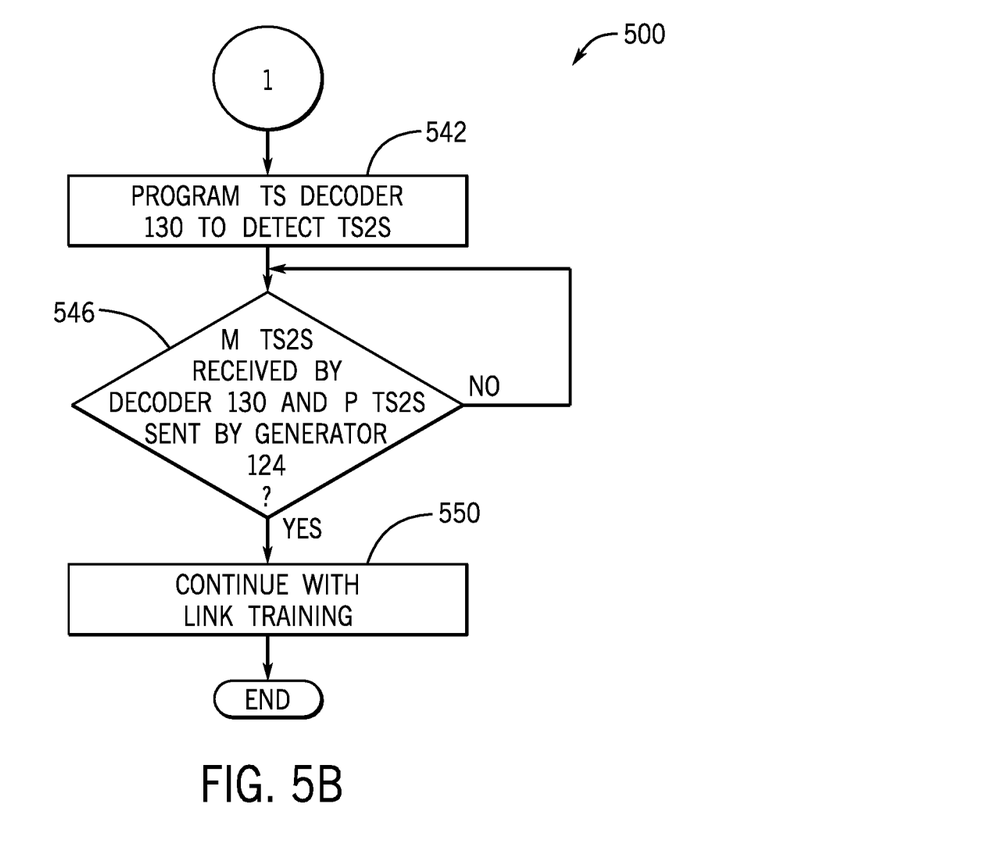

FIGS. 5A and 5B depict an example technique 500 that may be performed by the processor 122 to begin link training, in accordance with some implementations. Referring to FIG. 5A in conjunction with FIG. 2, the actions taken by the processor 122 involve the writing of data to and reading of data from the registers 126 and 132 for such purposes as programming the state machines 128 and 132, turning on and off components of the physical layer 208; reading the statuses of components of the physical layer 208; reading the statuses of the state machines 128 and 132; activating the state machines 128 and 132; registering one or multiple state machines 128 with the arbiter 330 (FIG. 3); and so forth.

The technique 500 includes the processor 122 programming (block 504) the training set generator 124 and training set decoder 130 with initial values and then turning on (block 508) the physical layer transmitter 210. After determining (decision block 512) that the physical layer transmitter 209 has been turned on, the processor 122 turns on the physical layer receiver 209, as depicted in block 516; and after determining (decision block 520) that the physical layer receiver 209 is turned on, the processor 122 begins programming (block 524) the training set generator 124 to send one or multiple training sets and programming (block 528) the training set decoder 130 to detect training set sequence(s).

As depicted by decision block 532, the processor 122 determines whether X first training sets have been received by the decoder 130 and whether Y first training sets have been sent by the generator 124. When this occurs, the processor 122 programs the training set generator 124 (block 536) and programs (block 542 of FIG. 5B) the training set generator 124 for a second training set. Referring to FIG. 5B, upon determining that M second training sets have been received by the decoder 130 and P training sets have been sent by the generator 124, the processor 122 continues with link training 550, which may involve the transmission and detection of additional training sets and corresponding programming of the training set generator 124 and decoder 130, in accordance with example implementations.

Figure 6:
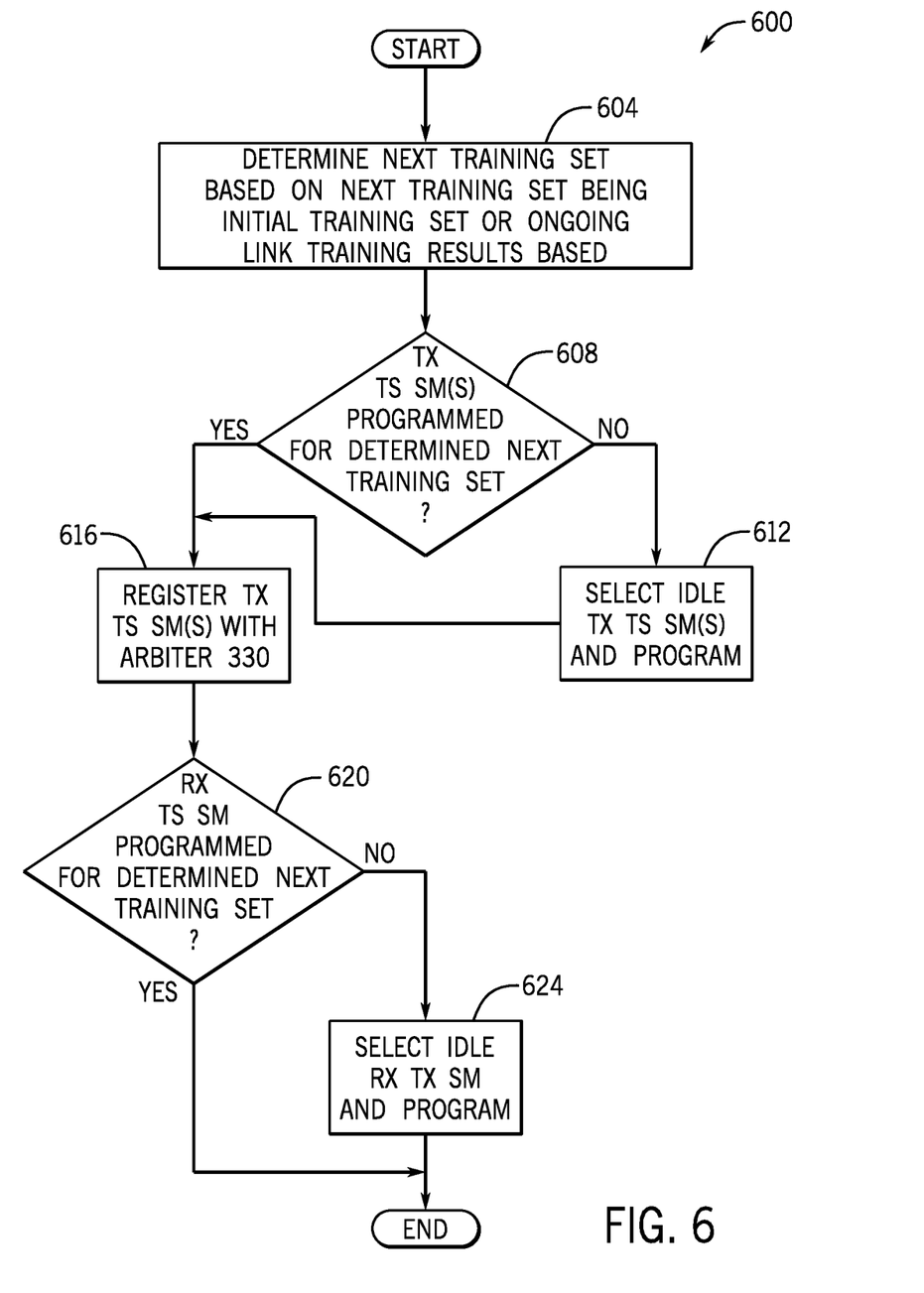
FIG. 6 is a flow diagram depicting example actions taken by the programmable link training engine to program state machines of the training set generator and training set decoder according to an example implementation.

FIG. 6 depicts an example technique 600 for programming the training set generator 124 and training set decoder 134 for a specific training set, in accordance with example implementations. Referring to FIG. 6 in conjunction with FIG. 2, the processor 122 determines (block 604) the next training set. In this regard, the next training set may be an initial training set based on a particular upper level protocol or may be a training set that is based on ongoing link training results. For example, for a particular upcoming phase of the link training, the results of the last phase may indicate that the endpoint device is capable or incapable of negotiating one of multiple protocols that are capable of being supported by the end devices. Therefore, based on whether the end device is capable of negotiating such protocols or not, this may be determinative of the particular training set that is sent in the next phase of the link training.

Upon determining the particular training set that is to be sent during the next phase, the processor 122 determines (decision block 608) whether a transmit state machine has been programmed for the determined training set. If so, then, pursuant to block 616, the processor 122 writes data to the configuration and status registers 126 to register this state machine with the arbiter 330. Otherwise, the processor 122 selects (block 612) an idle transmit state machine 220 and writes data to the configuration and status registers 126 to program the state machine and then registers (block 616) the state machine with the arbiter 330.

The processor 122 also determines (decision block 620) whether a received training set state machine 224 has been programmed for the next phase of the link training and if not, the processor selects an idle received training set state machine 224 and programs the state machine, pursuant to block 624.

Figure 7:
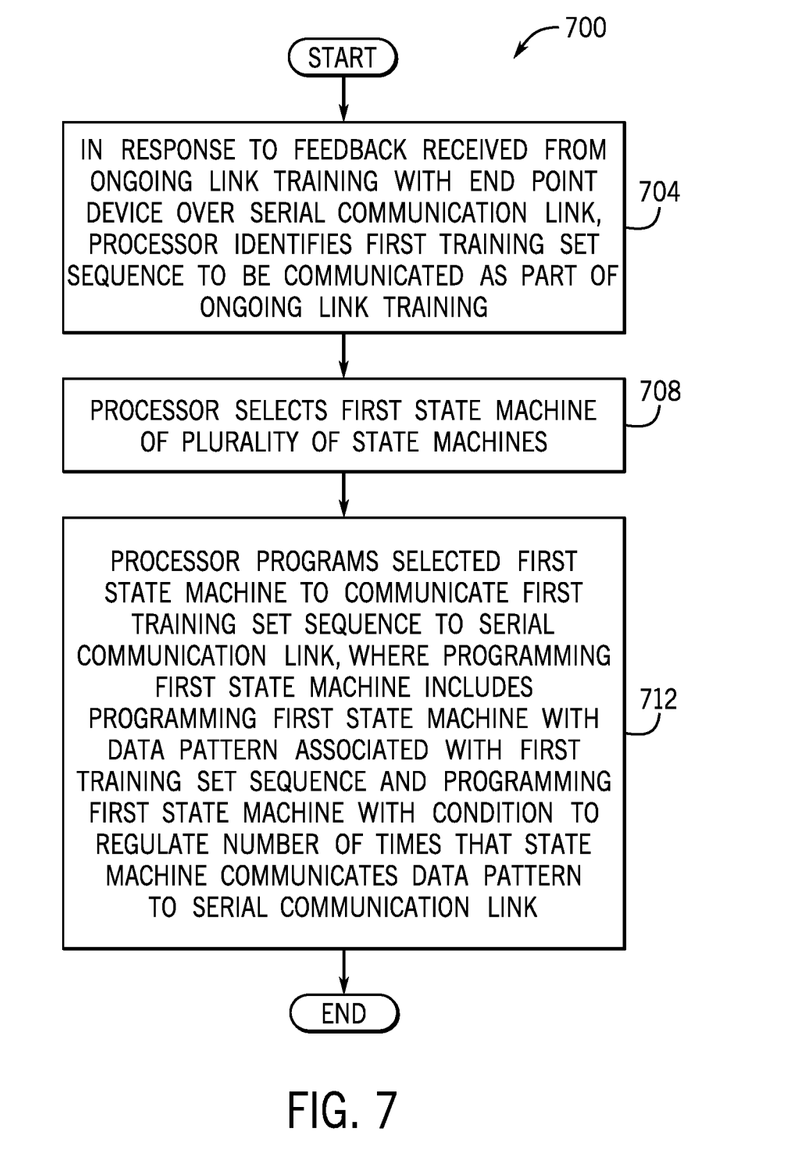
FIG. 7 is a flow diagram depicting a technique to program a state machine to communicate a training set sequence to a serial communication link according to an example implementation.

Referring to FIG. 7, in accordance with example implementations, a technique 700 includes, in response to feedback received from ongoing link training with an endpoint device over a serial communication link, a processor identifying (block 714) a first training set sequence to be communicated as part of the ongoing link training. The technique 700 includes the processor selecting (block 708) a first state machine of a plurality of state machines; and the processor programming (block 712) the selected first state machine to communicate the first training set sequence to the serial communication link. The programming of the first state machine includes programming the first state machine with a data pattern that is associated with the first training set sequence and programming the first state machine with a condition to regulate a number of times that the state machine communicates the data pattern to the serial communication link.

Figure 8:
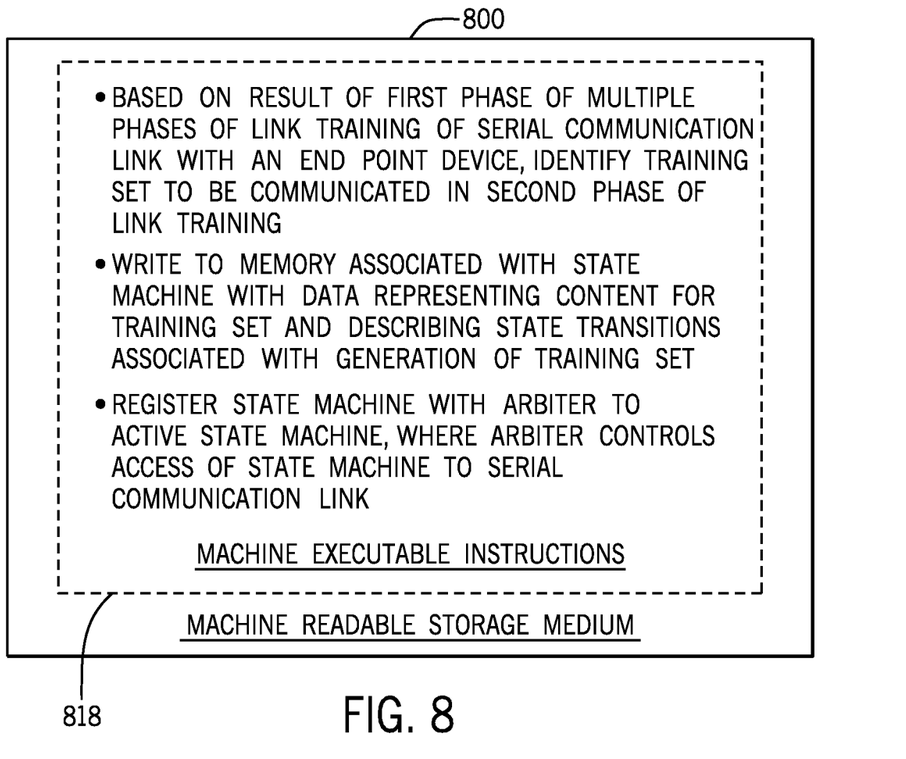
FIG. 8 is an illustration of a machine-readable storage medium that stores machine executable instructions to set up a state machine to provide a training set to be communicated in a link training phase according to an example implementation.

In accordance with example implementations, a non-transitory machine readable storage medium 800 stores machine executable instructions 818 to, when executed by a machine, cause the machine to based on a result of a first phase of multiple phases of a link training of a serial communication link with an endpoint device, identify a training set to be communicated in a second phase of the multiple phases. The instructions, when executed by the machine, cause the machine to write data to a memory that is associated with a state machine with data representing content for the training set and data describing state transitions associated with generation of the training set; and register the state machine with an arbiter to activate the state machine. The arbiter controls access of the state machine to the serial communication link.

Figure 9:
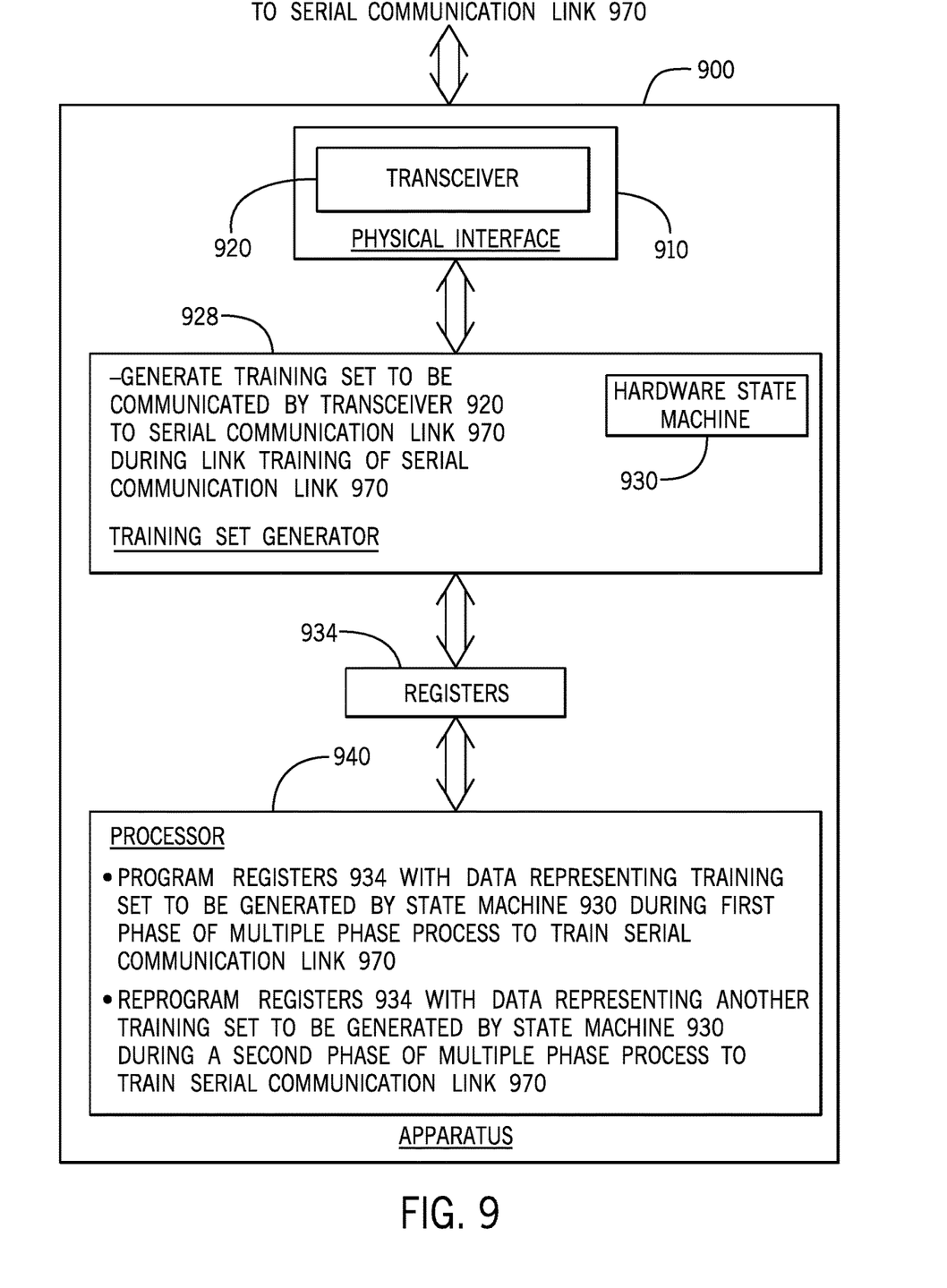
FIG. 9 is a schematic diagram of an apparatus to program and reprogram registers associated with a state machine of a training set generator to generate a training set to be communicated to a serial communication link during link training of the serial communication link according to an example implementation.

Referring to FIG. 9, in accordance with example implementations, an apparatus 900 includes a physical interface 910, a training set generator 928 and a processor 940. The physical interface 910 includes a transceiver 920 to communicate data with a serial communication link. The training set generator 928 is coupled to the physical interface 910 to generate a training set to be communicated by the transceiver 920 to the serial communication link during link training of the serial communication link. The training set generator 928 includes a hardware state machine 930, and the state machine 930 is associated with registers 934. The processor 940 programs the registers 934 with data representing a training set to be generated by the state machine 930 to be generated by the state 930 during a first phase of a multiple phase process to train the serial communication link and reprograms the registers 934 with data represented another training set to be generated by the state machine 930 during a second phase of the multiple phase process to train the serial communication link.

In accordance with example implementations, the systems and techniques that are described herein may have one or more of the following features. The feedback may include feedback regarding whether the endpoint device is capable of serial communication link protocol negotiation, and identifying the first training set sequence may include identifying a training set sequence associated with negotiating a serial communication link protocol. This has the particular advantage of allowing the accommodation of a wide number of protocols without limiting the choices to a few fixed protocols via fixed firmware or hardware.

The feedback may include feedback representing a protocol to be used in communication with the endpoint device over the serial communication link, and identifying the first training set sequence may include identifying a training set sequence associated with the protocol. This has the particular advantage of allowing the accommodation of a wide number of protocols without limiting the choices to a few fixed protocols via fixed firmware or hardware.

In accordance with example implementations, identifying the first training set sequence may include identifying a training set sequence that is associated with changing a data rate associated with communication over the serial communication link. This has the particular advantage of allowing the accommodation of a wide number of protocols without limiting the choices to a few fixed protocols via fixed firmware or hardware.

Identifying the first training set signals may include identifying a training set sequence that is associated with tuning equalization settings of a serial communication link transceiver. This has the particular advantage of allowing the accommodation of a wide number of protocols without limiting the choices to a few fixed protocols via fixed firmware or hardware.

In accordance with example implementations, a second training set sequence may be identified in response to the feedback; a second state machine may be selected; the selected state machine may be programmed to communicate the second training set sequence to the serial communication link; and an arbiter may be programmed, subsequent to the programming of the first and second state machines, to arbitrate access between the first and second state machines and the serial communication link. This has the particular advantage of allowing the accommodation of a wide number of protocols without limiting the choices to a few fixed protocols via fixed firmware or hardware.

In accordance with some implementations, the plurality of state machines may include a first plurality of state machines that are associated with transmitting data to the serial communication link. A second training set sequence to be received from the serial communication link as part of the ongoing link training may be identified in response to the feedback. The processor may select a second state machine of a second plurality of state machines, where the second plurality of state machines is associated with receiving data from the serial communication link. The processor may program the selected second state machine to receive the second training set sequence from the serial communication link, where the programming of the second state machine may include programming the second state machine with a packet header associated with the second training set sequence. This has the particular advantage of allowing the accommodation of a wide number of protocols without limiting the choices to a few fixed protocols via fixed firmware or hardware.

In accordance with some implementations, selecting the second state machine may include determining whether the second training sequence is based on analyzing packet data other than the packet header and selecting the second state machine based on the determination. This has the particular advantage of allowing the accommodation of a wide number of protocols without limiting the choices to a few fixed protocols via fixed firmware or hardware.

In accordance with example implementations, the first training sequence may include a plurality of training sequences, and the first state machine may be programmed to communicate the plurality of training sequences over the serial communication link. This has the particular advantage of allowing the accommodation of a wide number of protocols without limiting the choices to a few fixed protocols via fixed firmware or hardware.

In accordance with example implementations, programming the first state machine may include programming the first state machine with a data set representing a plurality of data patterns that correspond to the plurality of training sequences, and the condition may specify a condition for the first state machine to transition from a first data pattern to a second data pattern. This has the particular advantage of allowing the accommodation of a wide number of protocols without limiting the choices to a few fixed protocols via fixed firmware or hardware.

In accordance with example implementations, the condition may include at least one of a number of occurrences for the first data pattern to be transmitted to the serial communication link before the second data pattern is transmitted to the serial communication link; a time duration for the first data pattern to be repeatedly transmitted to the serial communication link before the second data pattern is transmitted to the serial communication link; or a trigger condition to cause a transition from the first data pattern being transmitted to the serial communication link to the second data pattern being transmitted to the serial communication link. This has the particular advantage of allowing the accommodation of a wide number of protocols without limiting the choices to a few fixed protocols via fixed firmware or hardware.

In accordance with example implementations, the trigger condition includes a condition to wait for the processor to trigger the transition from the first data pattern being transmitted to the serial communication link to the second data pattern being transmitted to the serial communication link. This has the particular advantage of allowing the accommodation of a wide number of protocols without limiting the choices to a few fixed protocols via fixed firmware or hardware.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A method comprising:
in response to feedback received from ongoing link training with an endpoint device over a serial communication link, a processor identifying a first training set sequence to be communicated as part of the ongoing link training, wherein the first training sequence comprises a plurality of training sequences;
the processor selecting a first state machine of a plurality of state machines; and
the processor programming the selected first state machine to communicate the plurality of training sequences over the serial communication link, wherein programming the first state machine comprises programming the first state machine with a dataset representing a plurality of data patterns corresponding to the plurality of training sequences and programming the first state machine with a condition that specifies a condition for the first state machine to transition from a first data pattern of the plurality of data patterns to second data pattern of the plurality of data patterns, wherein the condition comprises at least one of the following:
a number of occurrences for the first data pattern to be transmitted to the serial communication link before the second data pattern is transmitted to the serial communication link;
a time duration for the first data pattern to be repeatedly transmitted to the serial communication link before the second data pattern is transmitted to the serial communication link; or
a trigger condition to cause a transition from the first data pattern being transmitted to the serial communication link to the second data pattern being transmitted to the serial communication link.

2. The method of claim 1, wherein:
the feedback comprises feedback representing whether the endpoint device is capable of serial communication link protocol negotiation; and
identifying the first training set sequence comprises identifying a training set sequence associated with negotiating a serial communication link protocol.

3. The method of claim 1, wherein:
the feedback comprises feedback representing a protocol to be used in communication with the endpoint device over the serial communication link; and
identifying the first training set sequence comprises identifying a training set sequence associated with the protocol.

4. The method of claim 1, wherein
identifying the first training set sequence comprises identifying a training set sequence associated with changing a data rate associated with communication over the serial communication link.

5. The method of claim 1, wherein identifying the first training set sequence comprises identifying a training set sequence associated with tuning equalization settings of a serial communication link transceiver.

6. The method of claim 1, further comprising:
identifying a second training set sequence in response to the feedback;
selecting a second state machine of the plurality of state machines;
programming the selected second state machine to communicate the second training set sequence to the serial communication link; and
subsequent to the programming of the first and second state machines, programming an arbiter to arbitrate access between the first and second state machines and the serial communication link.

7. A method comprising:
in response to feedback received from ongoing link training with an endpoint device over a serial communication link, a processor identifying a first training set sequence to be communicated to the serial communication link and identifying a second training set sequence to be received from the serial communication link as part of the ongoing link training;
the processor selecting a first state machine of a first plurality of state machines associated with transmitting data to the serial communication link;
the processor selecting a second state machine of a second plurality of state machines associated with receiving data from the serial communication link;
the processor programming the selected first state machine to communicate the first training set sequence to the serial communication link, wherein programming the first state machine comprises programming the first state machine with a data pattern associated with the first training set sequence and programming the first state machine with a condition to regulate a number of times that the state machine communicates the data pattern to the serial communication link; and the processor programming the selected second state machine to receive the second training set sequence from the serial communication link, wherein programming the second state machine comprises programming the second state machine with a packet header associated with the second training set sequence.

8. The method of claim 1, wherein the trigger condition comprises a condition to wait for the processor to trigger the transition from the first data pattern being transmitted to the serial communication link to the second data pattern being transmitted to the serial communication link.

9. A non-transitory machine readable storage medium that stores instructions to, when executed by a machine, cause the machine to:
  based on a result of a first phase of multiple phases of a link training of a serial communication link with an endpoint device, identify a first training set sequence and a second training set sequence to be communicated in a second phase of the multiple phases;
  selecting a first state machine and a second state machine;
  programming the first state machine to communicate the first training set sequence to the serial communication link and the second state machine to communicate the second training set sequence to the serial communication link;
  register the first state machine and the second state machine with an arbiter to activate the first state machine and the second state machine; and
  programming the arbiter to arbitrate access between the first and second state machines and the serial communication link.

10. The storage medium of claim 9, wherein:
  the result comprises a determination of whether the endpoint device is capable of negotiating a protocol for communication over the serial communication link protocol; and
  the instructions, when executed by the machine, cause the machine to identify a training set associated with negotiating the protocol.

11. The storage medium of claim 9, wherein:
  the result comprises a protocol identified in the first phase; and
  the instructions, when executed by the machine, cause the machine to identify a training set associated with the protocol.

12. The storage medium of claim 9, wherein the instructions, when executed by the machine, further cause the machine to write data to a memory associated with the first state machine and the second state machine with data representing contents for the first and second training set sequences and data describing state transitions associated with generation of the first and second training set sequences.

13. An apparatus comprising:
  a physical interface comprising a transceiver to communicate data with a serial communication link;
  a training set generator coupled to the physical interface to generate a first training set sequence to be communicated by the transceiver to the serial communication link during link training of the serial communication link, wherein the training set generator comprises a first plurality of state machines associated with transmitting data to the serial communication link, and the state machine is associated with registers;
  a training set decoder coupled to the physical interface to receive a second training set sequence from the serial communication link during link training of the serial communication link, wherein the training set decoder comprises a second plurality of state machines associated with receiving data from the serial communication link; and
  a processor to:
    based on a result of a first phase of multiple phases of a link training of the serial communication link, identify a first training set sequence to be communicated to the serial communication link and a second training set sequence to be received from the serial communication link as part of the link training;
    select a first state machine of the first plurality of state machines;
    select a second state machine of the second plurality of state machines;
    program the first state machine to communicate the first training set sequence to the serial communication link, wherein programming the first state machine comprises programming the first state machine with a data pattern associated with the first training set sequence and programming the first state machine with a condition to regulate a number of times that the state machine communicates the data pattern to the serial communication link;
    program the second state machine to receive the second training set sequence from the serial communication link, wherein programming the second state machine comprises programming the second state machine with a packet header associated with the second training set sequence; and
    reprogram the registers with data representing another training set to be generated by the first state machine during a second phase of the multiple phase process to train the serial communication link.

14. The apparatus of claim 13, wherein the processor to reprogram the first state machine of the training set generator to adjust an equalization setting of the physical interface in connection with the second phase.

15. The apparatus of claim 13, wherein the processor to reprogram the first state machine of the training set generator to adjust a data rate setting of the physical interface.

16. The method of claim 7, wherein selecting the second state machine comprises:
  determining whether the second training set sequence is based on analyzing packet data other than the packet header; and
  selecting the second state machine based on the determination.

* * * * *